United States Patent [19]

Simsic

[11] Patent Number: 5,224,733
[45] Date of Patent: Jul. 6, 1993

[54] ARM REST SAFETY BAG APPARATUS

[76] Inventor: Joseph C. Simsic, 1302 Esplande, Redondo Beach, Calif. 90277

[21] Appl. No.: 842,269

[22] Filed: Feb. 27, 1992

[51] Int. Cl.$^5$ .............................................. B60R 21/22
[52] U.S. Cl. ..................................... 280/730; 280/735
[58] Field of Search ............... 280/728, 730, 735, 736, 280/737, 741; 248/74.1; 200/61.40, 61.08, 61.44

[56] References Cited

U.S. PATENT DOCUMENTS

| | | | |
|---|---|---|---|
| 3,243,151 | 3/1966 | Varney et al. | 248/74.1 |
| 3,708,194 | 1/1973 | Amit | 280/737 X |
| 4,018,457 | 4/1977 | Marlow | 280/737 X |
| 4,268,065 | 5/1981 | Granig | 280/737 |
| 4,966,388 | 10/1990 | Warner et al. | 280/734 X |
| 4,984,821 | 1/1991 | Kim et al. | 280/728 |

FOREIGN PATENT DOCUMENTS

| | | | |
|---|---|---|---|
| 1167411 | 4/1964 | Fed. Rep. of Germany | 248/74.1 |
| 2162662 | 6/1973 | Fed. Rep. of Germany | 248/74.1 |
| 2754880 | 6/1979 | Fed. Rep. of Germany | 200/61.44 |
| 3273959 | 12/1991 | Japan | 280/728 |
| 446836 | 2/1992 | Japan | 280/728 |

*Primary Examiner*—David M. Mitchell
*Assistant Examiner*—Gary C. Hoge
*Attorney, Agent, or Firm*—Leon Gilden

[57] ABSTRACT

A pneumatic safety bag is mounted within an arm rest housing of a vehicle door, whereupon impact of the door, the safety bag is instantaneously inflated by its pneumatic communication to a pneumatic cylinder operative through an electrical solenoid to effect inflation of the bag. Sensor and contact plates mounted within the door effect electrical communication relative to one another upon impact to open the solenoid valve for inflation of the bag.

4 Claims, 4 Drawing Sheets

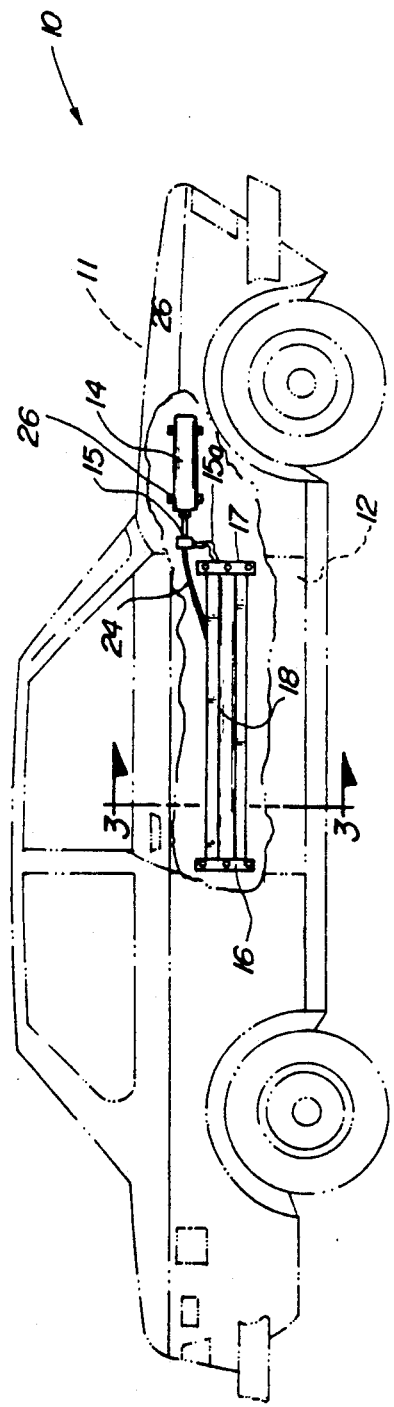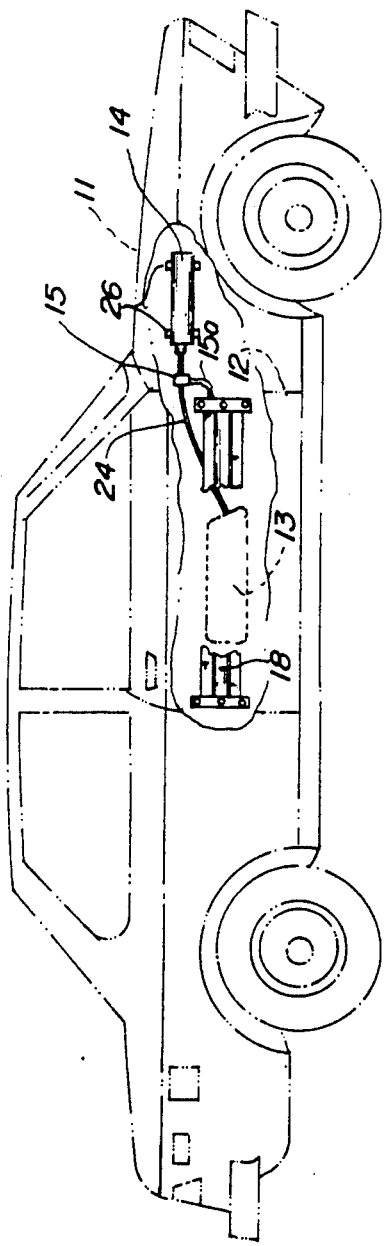

ARM REST SAFETY BAG APPARATUS

BACKGROUND OF THE INVENTION

1. Field of the Invention

The field of invention relates to safety bag apparatus, and more particularly pertains to a new and improved arm rest safety bag apparatus wherein the same is arranged for inflation upon impact of a vehicular door to afford protection to an individual contained within the vehicle.

2. Description of the Prior Art

Various safety apparatus and air bag systems are arranged for mounting within an automobile. Such patents are exemplified in the U.S. Pat. No. 4,974,874 to Muraoka illustrating various circuitry arranged for operation of an inflation of bag members within a vehicle.

U.S. Pat. No. 4,934,734 to Takada sets forth details to a bag structure arranged for inflation to afford protection to a vehicular occupant.

U.S. Pat. No. 3,703,702 to Arai; U.S. Pat. No. 4,938,500 to Nakazato; and U.S. Pat. No. 4,765,569 to Higgins set forth further examples of inflatable bags arranged for affording protection to occupants of vehicles.

As such, it may be appreciated that there continues to be a need for a new and improved arm rest safety bag apparatus as set forth by the instant invention which addresses both the problems of ease of use as well as effectiveness in construction in affording lateral protection to occupants of a vehicle and in this respect, the present invention substantially fulfills this need.

SUMMARY OF THE INVENTION

In view of the foregoing disadvantages inherent in the known types of inflation bag apparatus now present in the prior art, the present invention provides an arm rest safety bag apparatus wherein the same effects inflation upon impact of a door member relative to a vehicular occupant. As such, the general purpose of the present invention, which will be described subsequently in greater detail, is to provide a new and improved arm rest safety bag apparatus which has all the advantages of the prior art safety bag apparatus and none of the disadvantages.

To attain this, the present invention provides a pneumatic safety bag mounted within an arm rest housing of a vehicle door, whereupon impact of the door, the safety bag is instantaneously inflated by its pneumatic communication to a pneumatic cylinder operative through an electrical solenoid to effect inflation of the bag. Sensor and contact plates mounted within the door effect electrical communication relative to one another upon impact to open the solenoid valve for inflation of the bag.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved arm rest safety bag apparatus which has all the advantages of the prior art safety bag apparatus and none of the disadvantages.

It is another object of the present invention to provide a new and improved arm rest safety bag apparatus which may be easily and efficiently manufactured and marketed.

It is a further object of the present invention to provide a new and improved arm rest safety bag apparatus which is of a durable and reliable construction.

An even further object of the present invention is to provide a new and improved arm rest safety bag apparatus which is susceptible of a low cost of manufacture with regard to both materials and labor, and which accordingly is then susceptible of low prices of sale to the consuming public, thereby making such arm rest safety bag apparatus economically available to the buying public.

Still yet another object of the present invention is to provide a new and improved arm rest safety bag apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view, partially in section, of the invention.

FIG. 2 is an orthographic side view illustrating further details and orientation of the structure relative to an arm rest housing of the vehicle.

DESCRIPTION OF THE PREFERRED EMBODIMENT

Figure 3:
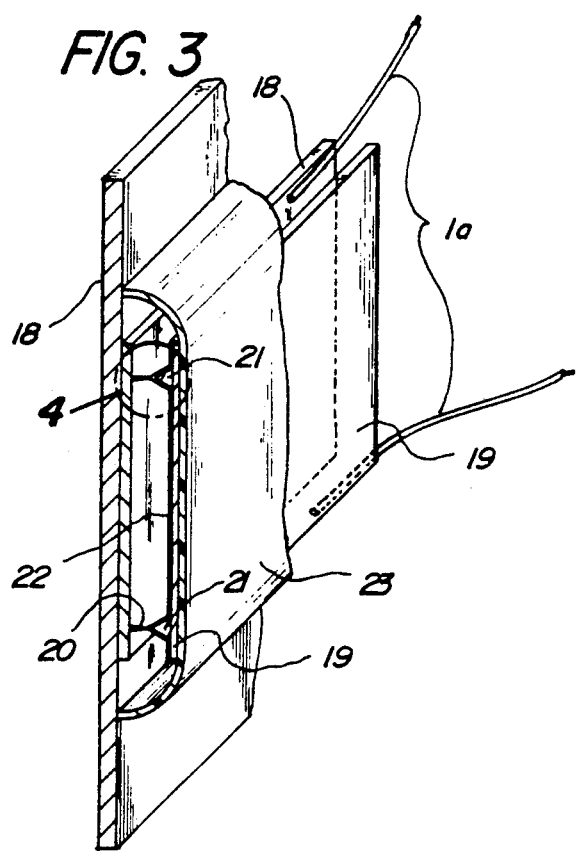
FIG. 3 is an orthographic view, taken along the lines 3—3 of FIG. 2 in the direction indicated by the arrows.

With reference now to the drawings, and in particular to FIGS. 1 to 9 thereof, a new and improved arm rest safety bag apparatus embodying the principles and concepts of the present invention and generally designated by the reference numeral 10 will be described.

More specifically, the arm rest safety bag apparatus 10 of the instant invention essentially comprises its positioning within a vehicle 11, and more specifically within each vehicle door 12. For purposes of illustration, only one such vehicle door is illustrated, but it is understood that each vehicle door may be similarly equipped. The vehicle door includes a door arm rest housing 13, in a manner such as illustrated in the FIGS. 2 and 8 for example.

Figure 4:
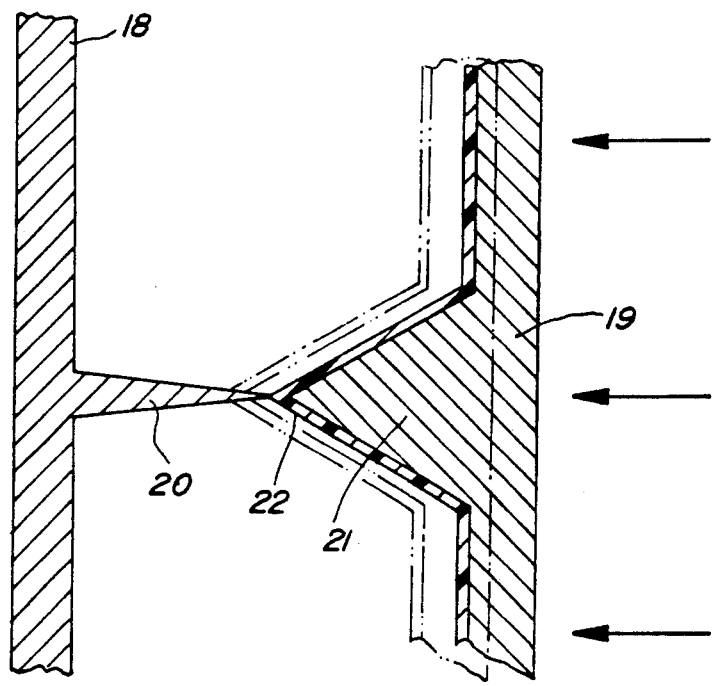
FIG. 4 is an orthographic side view illustrating section 4 as set forth in FIG. 3 in greater detail.
Figure 6:
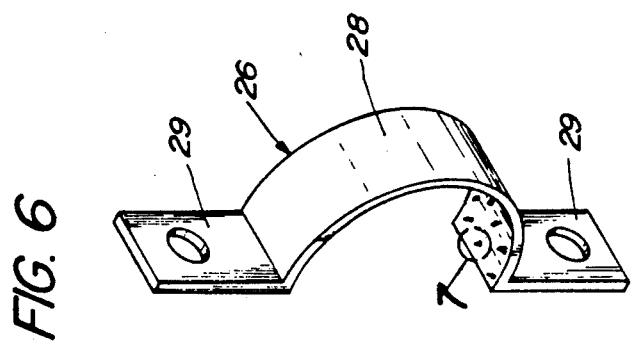
FIG. 6 is an isometric illustration of the support brackets arranged for mounting the pneumatic cylinder.
Figure 7:
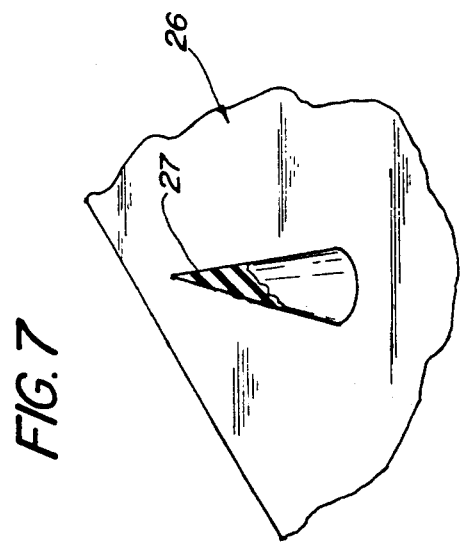
FIG. 7 is an enlarged isometric illustration of section 7, as set forth in FIG. 6.
Figure 5:
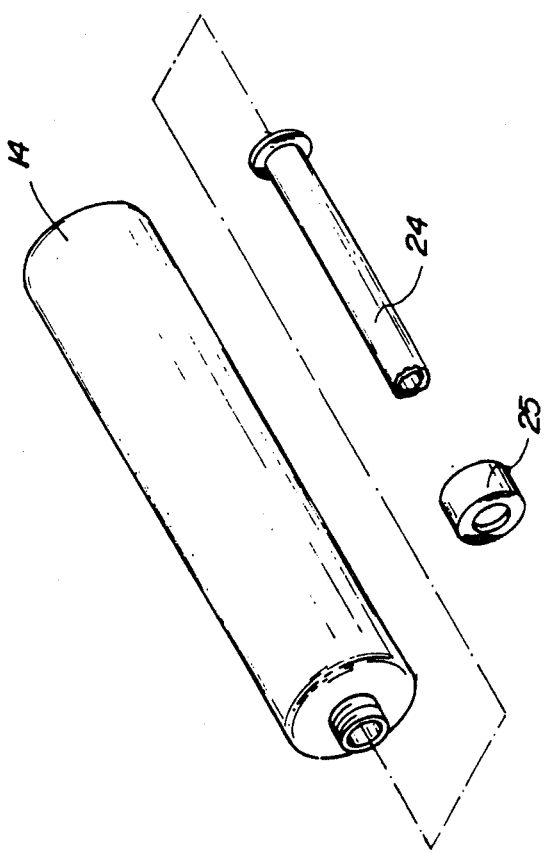
FIG. 5 is an isometric exploded view of the pneumatic cylinder of the invention.
Figure 8:
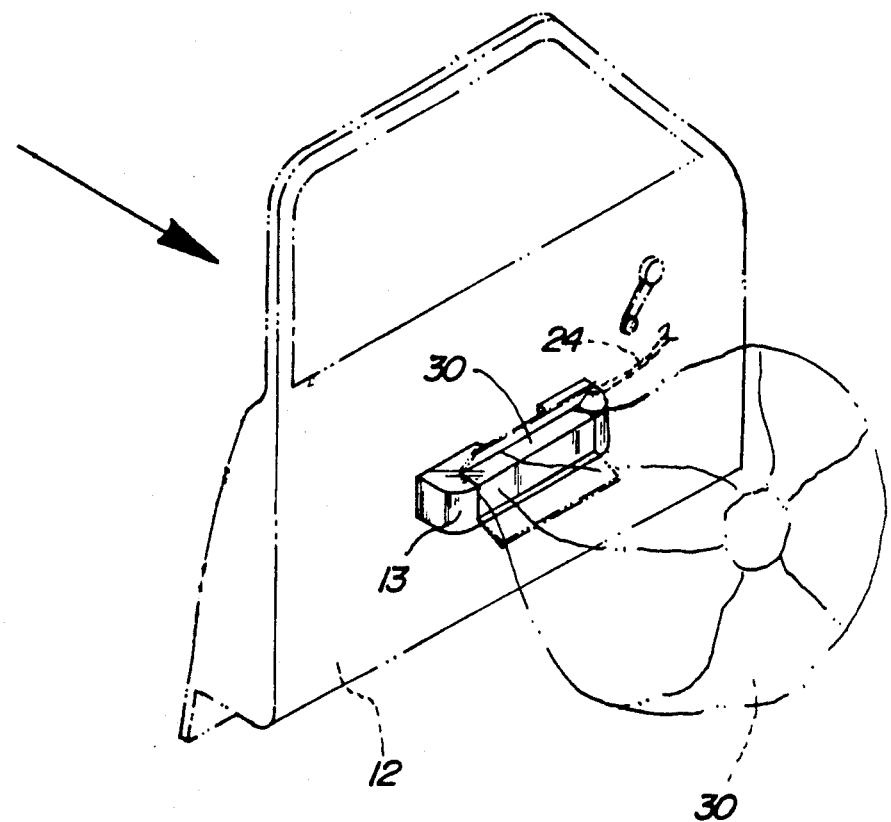
FIG. 8 is an isometric illustration of the arm rest housing relative to the inflation bag.
Figure 9:
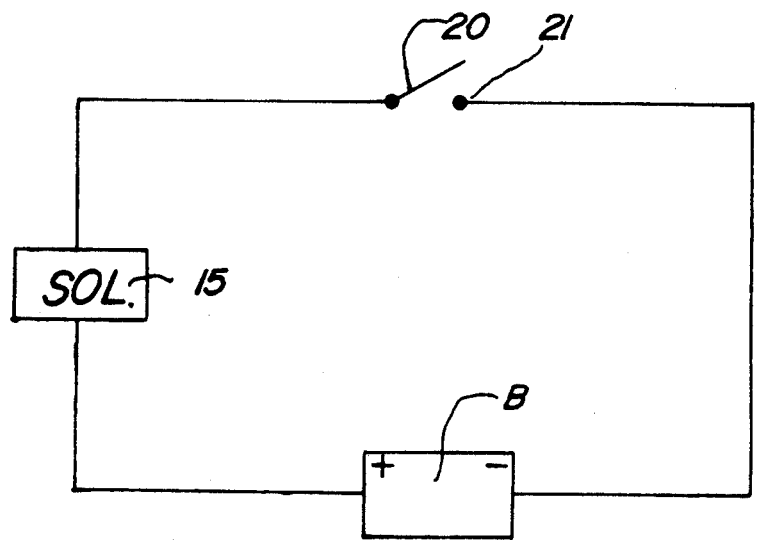
FIG. 9 is a diagrammatic illustration of electrical circuitry utilized by the invention.

With reference to FIG. 1, a pressurized pneumatic cylinder 14 is mounted within the vehicle spaced from the door, including a pneumatic cylindrical supply conduit 24 in pneumatic communication with the cylinder 15 at one end of the conduit, and a pneumatic bag member 30 (see FIG. 8) at its other end. A control solenoid valve 15 is positioned within the pneumatic cylindrical supply conduit 24 normally closed in electrical communication through electrical sensor solenoid cables 15a to a metallic flexible sensor plate 18 and a metallic impact control plate 19 mounted within the vehicle door 12. Respective first and second support members 16 and 17 secure the opposed distal ends of the plates 18 and 19 to the vehicle door. Further, the metallic flexible sensor plate 18 mounted interiorly of the door 12 includes a plurality of sensor plate spike members 20 projecting orthogonally from the sensor plate 18 positioned and coaxially aligned with a respective impact projection 21 of the associated contact plate 19. The impact projections 21, as well as the contact plate 19, are coated with a polymeric interior covering sheet 22 at least coextensive with the projections 21, and optionally with the contact plate 19, in a manner as illustrated in FIG. 4. In this manner, impact to the vehicle door from an exterior force effects projection of the spike members 20, or at least one of such spike members, into an associated impact projection 21 to complete electrical circuit, of a type as illustrated in the FIG. 9, to effect opening and actuation of the solenoid 15 obtaining electrical current from a battery "B", either independently of or alternatively the battery "B" as utilized by the vehicle 11. An exterior polymeric covering sheet 23 is mounted rearwardly of the contact plate 19 and its ends secured to the interior surface of the sensor plate 18 to afford covering protection to the spike members 20 and the projections 21 to minimize dust and debris contamination of the contact structure to include the spike members 20 and the projections 21.

The pneumatic cylinder 14 includes a pneumatic cylindrical cap 25 securing the pneumatic cylindrical supply conduit 24 to the pneumatic cylinder 14 to permit selective refilling of the pneumatic cylinder as required by removal of the cap and the associated supply conduit 24 from communication with the pneumatic cylinder 14. Rigid pneumatic cylinder support brackets 26 are provided of a type as illustrated in the FIG. 6 to include a semi-cylindrical support band 28, to include planar mounting flanges arranged in a coplanar relationship relative to one another for securement of the cylinder 14 to an interior portion of the associated vehicle 11. A matrix of resilient conical positioning projections 27 are mounted coextensively to the interior surface of the support band 28 for communication with the exterior surface pneumatic cylinder 14 to minimize vibration directed to the cylinder 14 in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An arm rest safety bag apparatus arranged for securement within a self-propelled vehicle, wherein the vehicle includes a door, and wherein the apparatus comprises, an arm rest housing arranged for securement to the door,
and
a pressurized pneumatic cylinder spaced from the arm rest housing, including a supply conduit,
and
a pneumatic bag member mounted within the arm rest housing,
and
the supply conduit in pneumatic communication between the bag member and the pneumatic cylinder,
and
a solenoid valve mounted within the supply conduit,
and
switch means mounted within the door for effecting selective opening of the solenoid valve to direct pneumatic pressurization of the pneumatic bag member from the pneumatic cylinder,
and
the switch means includes a metallic flexible sensor plate mounted within the door, and a contact plate positioned adjacent and coextensive with the sensor plate, wherein the deflection of the sensor plate effects communication with the contact plate to open the solenoid valve, and the sensor plate includes a plurality of sensor plate spike members fixedly mounted to the sensor plate and projecting towards the contact plate, and the contact plate includes a plurality of impact projections, with each of said spike members positioned in coaxially aligned relationship relative to one of said projections.

2. An apparatus as set forth in claim 1 wherein each of the projections includes a polymeric covering sheet coextensively laminated in surrounding relationship relative to each projection.

3. An apparatus as set forth in claim 2 further including a polymeric exterior covering sheet positioned in surrounding relationship relative to the contact plate, with the exterior covering sheet secured to the sensor plate to effect sealing of the spike members and the projections.

4. An apparatus as set forth in claim 3 including a plurality of rigid pneumatic support bands, each of the support bands arranged for positioning in surrounding relationship relative to the pneumatic cylinder, the support bands each include a matrix of resilient conical positioning projections mounted to an interior surface of each support band to accommodate vibration in securement of the pneumatic cylinder relative to the vehicle.

* * * * *